US006745617B2

(12) United States Patent
Murayama

(10) Patent No.: US 6,745,617 B2
(45) Date of Patent: Jun. 8, 2004

(54) SCANNING PROBE MICROSCOPE

(75) Inventor: Ken Murayama, Tsuchiura (JP)

(73) Assignee: Hitachi Kenki FineTech. Co., Ltd., Tokyo (JP)

( * ) Notice: Subject to any disclaimer, the term of this patent is extended or adjusted under 35 U.S.C. 154(b) by 179 days.

(21) Appl. No.: 10/038,667

(22) Filed: Jan. 8, 2002

(65) Prior Publication Data

US 2002/0089339 A1 Jul. 11, 2002

(30) Foreign Application Priority Data

Jan. 9, 2001 (JP) .......................................... 2001-001222

(51) Int. Cl.[7] .................................................. G01B 5/28
(52) U.S. Cl. ........................................................ 73/105
(58) Field of Search ............................ 73/105; 250/306, 250/307

(56) References Cited

U.S. PATENT DOCUMENTS 6,215,121 B1 * 4/2001 Fujihira et al. ............. 250/306
6,318,159 B1 * 11/2001 Chen et al. ................... 73/105

* cited by examiner

Primary Examiner—Robert Raevis
(74) Attorney, Agent, or Firm—Mattingly, Stanger & Malur, P.C.

(57) ABSTRACT

This scanning probe microscope is provided with a cantilever with a probe tip facing a sample, a Z fine movement section for changing a distance between the sample and the probe tip, a XY scanning control section for providing relative displacement toward a sample surface between the sample and the probe tip, a displacement detecting means for detecting displacement arising in the cantilever, and a Z direction control section. In the configuration, when generating deformation in the cantilever due to a physical amount between the probe tip and the sample, the displacement detecting means detects the displacement of the cantilever, and the displacement of the cantilever is controlled to be a predetermined constant value. The scanning probe microscope further has a two frequency signals generating section for providing signals used to cause the probe tip to be moved in height direction by two frequencies to the Z fine movement section. According to this configuration, in the scanning probe microscope, the probe tip does not receive the force of lateral direction when scanning the sample surface, the high-speed measurement is possible and the wear of the probe tip is reduced.

1 Claim, 3 Drawing Sheets

HIGH FREQUENCY F1:SINE WAVE
LOW FREQUENCY F2:SINE WAVE

HIGH FREQUENCY F1:SINE WAVE
LOW FREQUENCY F2:TRIGGER PULSE WAVE

SCANNING PROBE MICROSCOPE

BACKGROUND OF THE INVENTION

1. Field of the Invention

The present invention relates to a scanning probe microscope, and more particularly, relates to a scanning probe microscope making it possible to shorten a contact time for a probe tip being contact with a sample surface and thereby perform measurement with smooth movement of the probe tip on the sample surface.

2. Description of the Related Art

A scanning probe microscope (SPM) is a measurement equipment capable of measuring objective samples of an atomic size level in its resolution. The scanning probe microscope is being used in various kinds of wide fields, such as measurement of the surface shape of substances or materials and measurement of the surface shape of semiconductor-chips including LSI. The scanning probe microscope is provided with a cantilever having a probe tip at its pointed end. The scanning probe microscope measures the sample by detecting a physical amount generated between the probe tip and the sample when making the probe tip approached to the sample to be measured with a required distance. There are various kinds of the scanning probe microscopes responding to the physical amounts used for the detection, such as a scanning tunneling microscope (STM), an atomic force microscope (AFM) and a magnetic force microscope (MFM). For this reason, the applicable field for the scanning probe microscope is being enlarged presently.

Among the above-mentioned microscopes, the atomic force microscope is suitable when detecting the surface shape of the sample with high resolution, and it actually becomes useful in the fields of the semiconductor devices, the optical disks and so on. Hereinafter, the atomic force microscope will be explained.

The principles of the measurement based on the atomic force microscope are roughly divided into "contact mode" and "non-contact mode" in response to the relationship produced between the probe tip and the sample surface. In the current stage, the measurement of the contact mode is mainly used in the technical field of industrial surface form measurement, because the measurement of the non-contact mode is slow in a measuring speed.

The outline of fundamental structure of the atomic force microscope performing the surface shape measurement in the contact mode is as follows.

In the atomic force microscope, a coarse movement mechanism section is fixed to a fixing part such as a support frame, and a fine movement mechanism section is attached to the lower part of the coarse movement mechanism section, and a cantilever is further attached to the lower end of the fine movement mechanism section. A probe tip is formed at the tip of the cantilever. The probe tip is directed to the surface of the sample placed at a lower spot in the state of approaching it to the sample. The above-mentioned coarse movement mechanism section is a means for approaching the probe tip to the surface of the sample in the height direction (Z direction) with a comparatively large distance, and it is used for an early approach movement of the probe tip. The fine movement mechanism section is a means for moving the probe tip to three-dimensional directions (each axis direction of X-axis, Y-axis and Z-axis intersecting perpendicularly mutually) in a comparatively fine distance. The fine movement mechanism section is comprised of a XY fine movement section for moving the probe tip along the sample surface directions (XY directions) as a scanning movement, and a Z fine movement section for moving the probe tip to the height direction. A control section controls operations of the coarse and fine movement mechanism sections. The cantilever is moved downward by the operations of the coarse and fine movement mechanism sections. When the probe tip approaches the sample surface sufficiently, the atomic force given from the sample surface to the probe tip causes the cantilever to be bent to make the cantilever deformation. Displacement detection means comprised of a laser light source and an optical detector detects the deformation of the cantilever. The laser light emitted from the laser light source is irradiated onto the back of the cantilever, and then the laser light reflected on the back of the cantilever enters the light-receiving surface of the optical detector. In accordance with the arrangement of the displacement detection means, when the deformation arises in the cantilever, the displacement of the probe tip in the Z direction can be detected, since the laser light incidence position on the light-receiving surface of the optical detector changes. The information on the position of the probe tip in the height direction, which is detected by the optical detector, is compared with a standard position (target standard value) set up beforehand, and the difference obtained by the above comparison is inputted into the above-mentioned control section. On the basis of the information on the difference, the control section gives a signal used for controlling the operation of Z fine movement section to the Z fine movement section so that the height of the probe tip to the sample surface (the difference between the sample and the probe tip) may be consistent with the standard position.

The configuration mentioned above makes the probe tip of the cantilever scan the shape of the sample surface to follow it, detecting the atomic force produced between the sample surface and the probe tip and controlling the distance between the sample surface and the probe tip to be constant (target standard value). In this measurement operation, the control section is usually configured by a proportion and integration control (PI control). In order to keep the distance between the sample surface and the probe tip constant, the atomic force between the sample surface and the probe tip can be kept contact.

When measuring the shape of the sample surface by following it based on the scanning operation while the distance between the sample and the probe tip is kept constant, as mentioned above, the contact mode is used. There are some modes in the contact mode, and they are shown in FIGS. 4A, 4B and 4C. FIG. 4A shows a static contact mode and FIGS. 4B and 4C show dynamic contact modes. In FIGS. 4A–4C, a reference number 101 designates the pointed end of the probe tip, and 102 the sample.

The static contact mode measurement is a most general method. In this measurement, the probe tip is continuously moved between each two of measuring points ①–⑤ along the surface of the sample 102 as shown by an arrow 103. The measurement of this method makes it possible to perform a high-speed measurement in a viewpoint of time and space because it is performed with the continuous operation.

The Dynamic contact mode is arranged so that the probe tip 101 may once be separated from the surface of the sample 102 with the advance of the scanning movement. As to the dynamic contact mode, FIG. 4B shows the method of contacting the probe tip 101 onto the sample surface only at the measuring points ①–⑤ as shown by an arrow 104, and FIG. 4C shows the method of repeating the contact and separation by making the probe tip 101 or the cantilever resonate in the Z direction as usually shown by arrow 105 using a sine wave etc. (several tens to several hundreds kHz). In FIG. 4C, the movements of contact and separation are also repeated in spots other than the measuring point ①–⑤.

The measurement method by the above-mentioned static contact mode is unsuitable for samples which have steep level differences or generate large frictional forces, because the probe tip receives the force in the scanning direction or the frictional force with the advance of the scanning movement. Furthermore, if a large lateral force is operated to the probe tip, the sample surface is damaged, and therefore it is also unsuitable for the measurement of soft samples.

The above-mentioned dynamic contact mode shown in FIGS. 4B and 4C can solve the problem about the lateral force in the static contact mode, and has the advantage of being suitable for the measurement of the sample with the steep level differences or large frictional forces. Furthermore, since the contact time for the probe tip onto the sample surface is short in case of the dynamic contact mode shown in FIG. 4B, it also has the advantage that there is little wear at the pointed end of the probe tip. However, since discontinuous operations are repeated in the aspect of time and space in the case shown by FIG. 4C, the case has the problem that it requires a lot of time for the operation and the measurement speed becomes slow. On the other hand, the dynamic contact mode of FIG. 4C has the property of continuity like the static contact mode and is also suitable for the high-speed measurement because of repeating the contact and separation movements by high frequency. However, the case shown by FIG. 4C has the problem of receiving the force of the lateral direction not a little, because of increasing the contact time and repeating the contact operations during the scanning movement, as compared with the case shown by FIG. 4B. The measurement method of FIG. 4C has a disadvantage in a viewpoint of the wear at the pointed end of the probe tip.

SUMMARY OF THE INVENTION

An object of the present invention is to solve the above-mentioned problems, and is to provide a scanning probe microscope capable of performing a high-speed measurement without receiving the lateral force due to the scanning movement when moving the probe tip along the sample surface, and reducing the wear of the probe tip.

The scanning probe microscope of the present invention has the following configuration in order to attain the above-mentioned object.

The first scanning probe microscope is provided with a cantilever with a probe tip facing a sample, a Z fine movement section for changing a distance between the sample and the probe tip, a XY scanning control section for providing relative displacement toward a sample surface between the sample and the probe tip, a displacement detecting section for detecting displacement arising in the cantilever, and a Z direction control section. The cantilever is preferably attached to the Z fine movement section. The displacement detecting section is preferably an optical lever type displacement detection mechanism configured to use a laser light, which contains a laser generator and an optical detector. In accordance with the above configuration, when the deformation arises in the cantilever due to a physical amount between the probe tip and the sample, the displacement detecting section detects the displacement of the cantilever due to the deformation thereof, and the Z direction control section controls so as to keep the displacement of the cantilever a predetermined constant value and thereby the physical amount on the surface of the sample is measured. Further the scanning probe microscope comprises a two frequency signals generating section for providing signals used to cause the probe tip to be moved in height direction by at least two frequencies to the Z fine movement section as its characteristic part. By this two frequency signals generating section, the probe tip is moved in the height direction using the at least two frequencies, and the physical amount generated between the probe tip and the sample surface is detected when the probe tip approaches the sample based on the second frequency.

According to the present invention with the above-mentioned structure, in the measurement operation based on the dynamic contact mode in which the contact and separation movements are repeated, the repeated movement is performed by using the cyclic signals of the two frequencies. In this case, it is not limited to the two cyclic signals and two or more cyclic signals may also be used. Using the two cyclic signals of the two frequencies can simultaneously realize the reductions of high-speed measurement and contact time because of the Z direction movement of the low frequency proportional to the cycle of the measuring points, and repeating the contact and separation movement by the high frequency.

The second scanning probe microscope has, in the above configuration, the feature that each movement based on the two frequencies is a sine wave movement. In accordance with this feature the high-speed measurement can be performed continuously in points of time and space because both of the two cyclic signals give smooth sine wave movements.

The third scanning probe microscope has, in the above configuration, the feature that concerning the movement based on the two frequencies, the movement due to the first frequency is a sine wave movement and the movement due to the second frequency is a trigger pulse movement.

According to the present invention, as mentioned above, in the measurement of the sample surface by the scanning probe microscope, when moving the probe tip along the sample surface with the required distance concerning the measurement area of the surface, the movement of the probe tip is made by the oscillations using the two frequency signals of high and low frequencies and thereby the contact time of the probe tip on the sample surface during the scanning operation is shortened. Thereby the lateral force the probe tip receives when it moves can be reduced, the wear of the pointed end of the probe tip is prevented, and the high-speed measurement can be performed.

DESCRIPTION OF THE PREFFERED EMBODIMENTS

Hereinafter, preferred embodiments of the present invention will be described with reference to the accompanying drawings.

Figure 1:
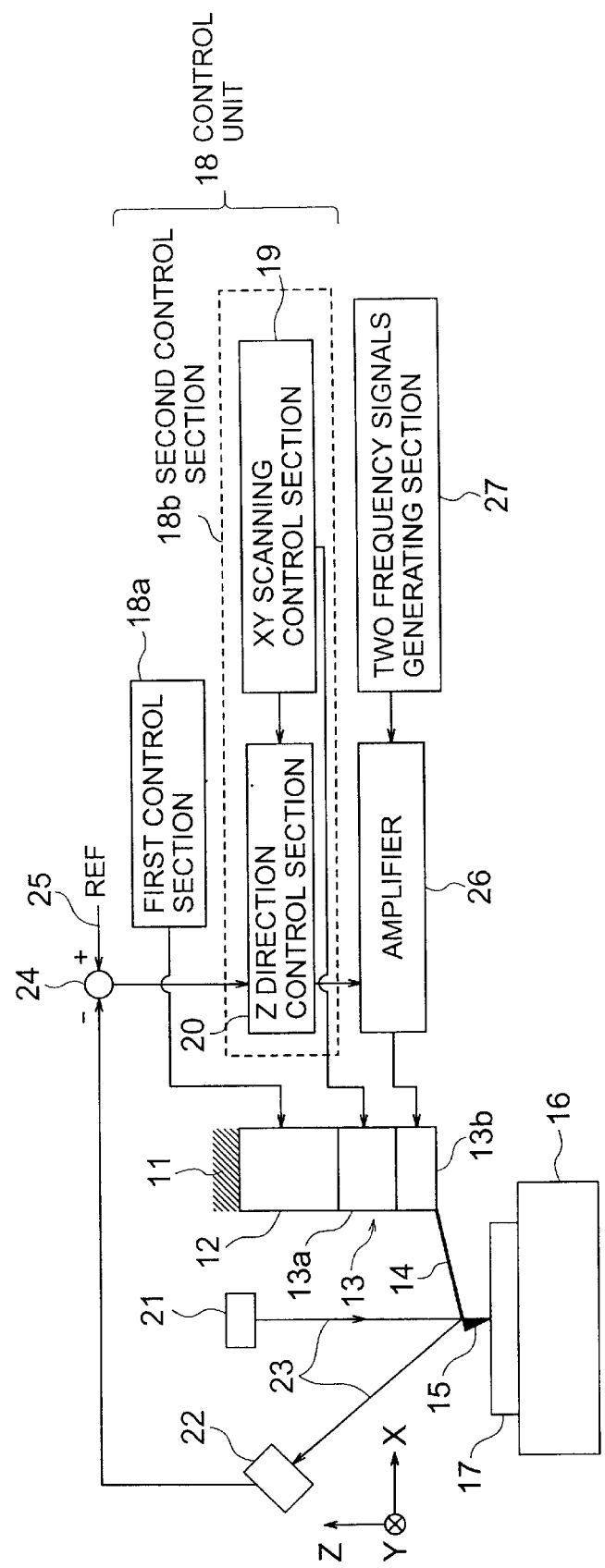
FIG. 1 is a view showing a configuration of the atomic force microscope which is one example of the scanning probe microscope of the present invention.

FIG. 1 shows schematically principal parts of an atomic force microscope as an embodiment of the scanning probe microscope in accordance with the present invention. Though the atomic force microscope is explained in this embodiment, the present invention is not limited to this. In the atomic force microscope shown in FIG. 1, a coarse movement mechanism section 12 is fixed to a fixing section 11 such as a supporting frame and the like, and a fine movement mechanism section 13 is attached to the lower part of the coarse movement mechanism section 12. There is a cantilever 14 whose base part is fixed to the lower end of the fine movement mechanism section 13. A probe tip 15 is formed at the tip of the cantilever 14. A sample 17 is placed on a stage 16 below the cantilever 14. The pointed end of the probe tip 15 is facing the surface of the sample 17 in an approaching state.

The above-mentioned coarse movement mechanism section 12 is an approaching means for moving the probe tip 15 toward the surface of the sample 17 in the height direction (Z direction) comparatively in a large distance. The coarse movement mechanism section 12 is used for an early approach movement of the probe tip 15. The fine movement mechanism section 13 is a means for moving the probe tip 15 to three-dimensional directions (each direction of X, Y and Z) in a comparatively fine distance. The fine movement mechanism section 13 is comprised of a XY fine movement section 13a for moving the probe tip 15 along the surface directions (XY directions) of the sample 17 as a scanning movement, and a Z fine movement section 13b for moving the probe tip 15 to the height direction (Z direction). The fine movement mechanism section 13 is usually configured to use piezoelectric element. A tube type fine movement mechanism or a tripod mechanism etc. is used as the fine movement mechanism section 13. The movements of the coarse and fine movement mechanism sections are controlled by a control unit 18. Further, the control unit 18 has a first control section 18a for controlling the movement of the coarse movement mechanism section 12 and a second control section 18b for controlling the movement of the fine movement mechanism section 13. Further, the second control section 18b is comprised of XY scanning control section 19 for controlling the movement of the XY fine movement section 13a and Z direction control section 20 for controlling the movement of the Z fine movement section 13b.

In relation to the above cantilever 14, an optical displacement detection unit of the optical lever type, which is used for detecting the displacement produced due to bending deformation of the cantilever 14, is arranged. The optical lever type displacement detection unit is comprised of a laser generator (a laser source or laser oscillator) 21 emitting a laser light (a laser beam) 23 irradiated to the back of the cantilever 14, and an optical detector 22 receiving the laser light 23 reflected at the back. Illustration of an electric power source making the laser generator 21 and the optical detector 22 operative is omitted. If the cantilever 14 has the bending deformation, since the incidence position of the laser light on the light-receiving surface of the optical detector 22 is changed, thereby, the displacement produced in the cantilever 14 can be detected. It is notable that, in addition, an optical interfering method, a piezo-resistive method, etc. can be used for detecting the displacement of the cantilever 14.

The detection signal concerning the displacement of the cantilever 14, which is outputted from the optical detector 22, is inputted into a comparator (or subtracter) 24. A reference value (REF) 25 is set up and inputted into the comparator 24. The comparator 24 calculates the difference value between the reference value and the detection signal value. The signal of the difference value is inputted into the Z direction control section 20 of the second control section 18b of the control unit 18. The Z direction control section 20 performs control processing of a proportion and integration compensation in the same way as the conventional case and generates a control signal to be outputted. The outputted control signal is provided to the Z fine movement section 13b of the fine movement mechanism section 13 via an amplifier 26.

When the cantilever 14 is moved downward by the operations of the above-mentioned coarse movement mechanism section 12 and fine movement mechanism section 13 so that the probe tip 15 may approach the surface of the sample 17 in a predetermined distance, the bending deformation occurs in the cantilever 14 due to the atomic force from the surface of the sample 17 to the probe tip 15. The bending deformation of the cantilever 14 can be detected by the optical lever type displacement detection unit comprising the laser generator 21 and the optical detector 22. After the laser light 23 emitted from the laser generator 21 is irradiated to the back of the cantilever 14, it enters the light-receiving surface of the optical detector 22.

In the above-mentioned configuration, when the cantilever 14 is deformed, the optical detector 22 detects the Z direction displacement of the probe tip 15. The position information on the height direction of the probe tip 15, which is detected by the optical detector 22, is compared with the reference value 25 previously set up in the comparator 24, and thereafter the signal of the difference is inputted into the Z direction control section 20 within the control unit 18. The Z direction control section 20, using the information on the difference inputted, generates a signal used for controlling the Z fine movement section 13b of the above fine movement mechanism section 13 so that the height of the probe tip 15 to the sample surface (the difference between the sample and the probe tip) may be consistent with the reference position. The control signal is inputted into the Z fine movement section 13b. On the basis of the above-mentioned feedback control, the atomic force between the sample and the probe tip is kept constant, resulting in that the distance between the two is also kept constant.

According to the above-mentioned configuration, when setting the height position of the probe tip to the sample surface to be the predetermined spot depending on the above reference value by the height position control system of the cantilever 14 while scanning the surface of the sample 17 by the probe tip on the basis of the operation of the XY fine movement section 13a of the fine movement mechanism section 13 using the scanning control signal given the XY scanning control section 19, the probe tip 15 moves following the shape of the sample surface and thereby the surface shape of the sample 17 can be measured.

Further, the above-mentioned configuration has a two frequency signals generating section 27 which gives signals for exercising the probe tip 15 in the height direction by use of the two frequencies to the Z fine movement section 13b. The signals concerning the two frequencies from the two frequency signals generating section 27 is given to the Z fine movement section 13b via an amplifier 26. Each of the two frequency signals outputted from the two frequency signals generating section 27 is a signal used for making the probe tip 15 periodically approached to or separated from the surface of the sample 17. The frequencies of two frequency signals generated in the two frequency signals generating section 27 is arbitrarily defined according to the conditions of the measurement applied, for example, the condition of the measurement range or the sample surface. The two frequency signals outputted from the two frequency signals generating section 27, which are given to the Z fine movement section 13b, make a composition of the two cycle movements concerning the height-direction movement of the cantilever 14 or the probe tip 15. Although the Z fine movement section 13b is provided with the signals of two frequencies or cycles in the above explanation, the Z fine movement section 13b may be configured to have two or more exclusive Z fine piezoelectric elements in order to give one or both of the two frequency signals.

Next, it will be explained how to change the movement of the probe tip 15 on the basis of the two frequency signals outputted from the two frequency signals generating section 27 with reference to FIG. 2.

Figure 2:
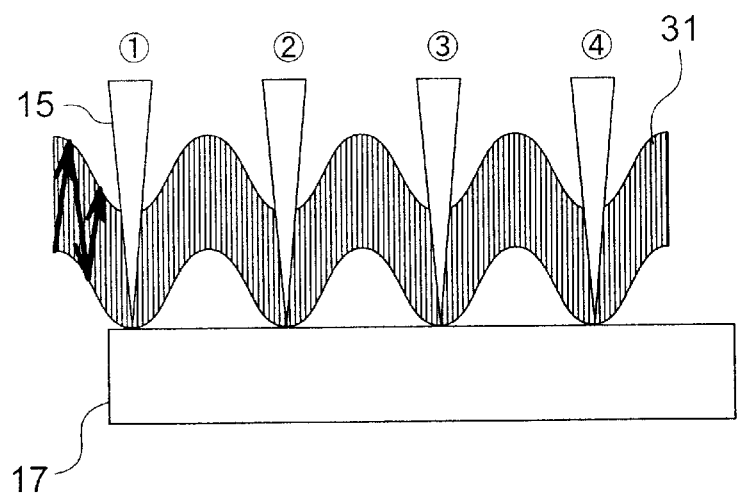
FIG. 2 is a view illustrating the measurement operation of the probe tip of the first embodiment of the present invention.

In FIG. 2, one of the two frequency signals for the approach and separation movement is a high frequency and sine wave signal of frequency F1 and the other is a low frequency and sine wave signal of frequency F2. The probe tip 15 is repeatedly moved upward and downward in the height direction by the high frequency F1 and the low frequency F2 while being scanned from left side to right side in the figure on the surface of the sample 17. In FIG. 2, a reference number 31 designates a composite movement of the probe tip generated by composing two oscillating movements due to the high frequency F1 and the low frequency F2. The high frequency F1 lies in the range of 10–100 kHz and the low frequency F2 lies in the range of 10–256 Hz, for example. In FIG. 2, measuring points ①–④ are shown. The probe tip 15 comes in contact with the surface of the sample 17 in a very short time at the measuring points settled by the low frequency F2 while being oscillated in the height direction by the high frequency F1. When the probe tip 15 touches the surface of the sample 17 at the measuring point ④, the pointed end of the probe tip 15 further touches the sample surface on the high frequency decided by the high frequency F1. Although the high frequency F1 is usually selected to be consistent with the resonance point of the cantilever lever 14 in many cases, it may not be limited to this and may be selected to become frequency lower than it.

When the probe tip 15 is moved close to the surface of the sample 17 by the coarse movement mechanism section 12 for approach, the probe tip 15 is being operated compulsorily to the Z direction in the two frequencies or cycles (F1, F2). The fact is that the optical detector 22 detects the amplitude of the high frequency oscillation and the approach and separation movements of the probe tip are repeated on the basis of the controlling so that the amplitude should be constant value predetermined. In the measuring points ①–④, since the contacts between the probe tip 15 and the sample 17 take place in accordance with the low frequency oscillation, the surface shape of the sample 17 can be measured by monitoring the change of amplitude level of the second frequency.

Figure 4A:
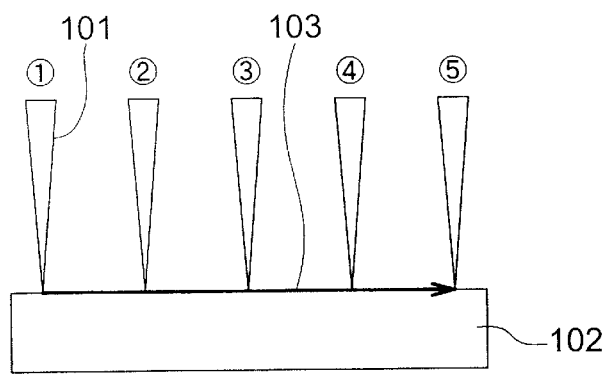
FIGS. 4A, 4B and 4C are views for explaining the problem resulting from the measurement operation of the probe tip of the conventional scanning probe microscope.
Figure 4B:
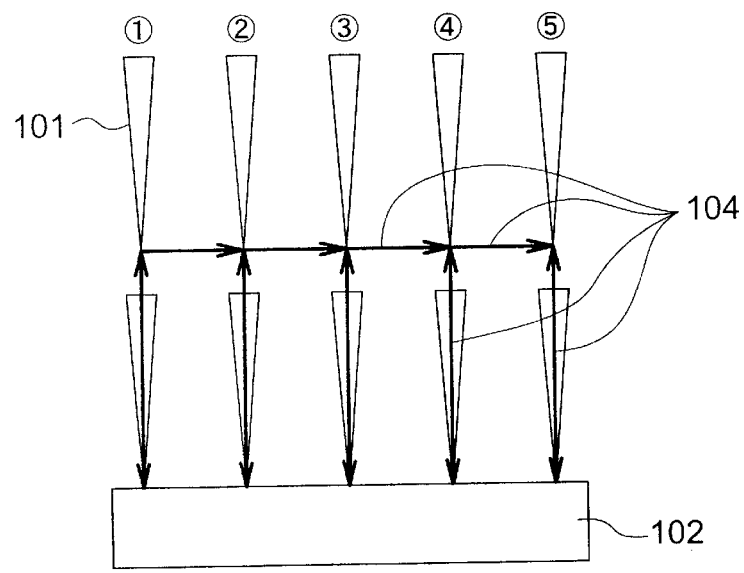
Figure 4C:
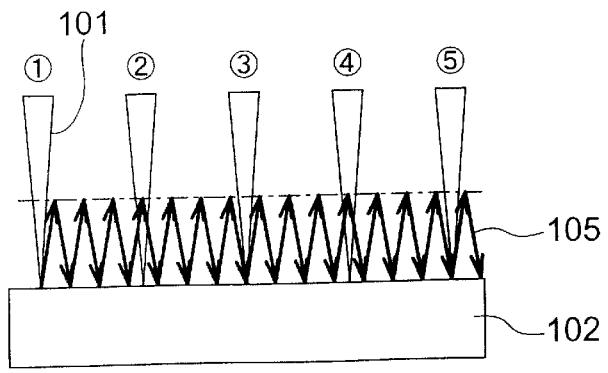

In accordance with the measurement method based on the configuration of the present embodiment, the contact time of the probe tip 15 with the sample surface is given as the product of the contact time by the oscillation based on the low frequency F2 and that by the oscillation based on the high frequency F1. That is, as compared with the measurement method (FIG. 4C) by the dynamic contact mode explained as the conventional method in which the approach and separation are continuously repeated, the contact time in the present embodiment be shortened, and therefore the measurement method of the present embodiment can improve the extent of wear of the probe tip. Furthermore, as compared with the measurement method by the dynamic contact mode shown in FIG. 4B, which is explained as the conventional method, smooth operation can be made in the aspects of time and space, and therefore very high-speed measurement can be performed because of the use of two sine wave frequency signals.

Figure 3:
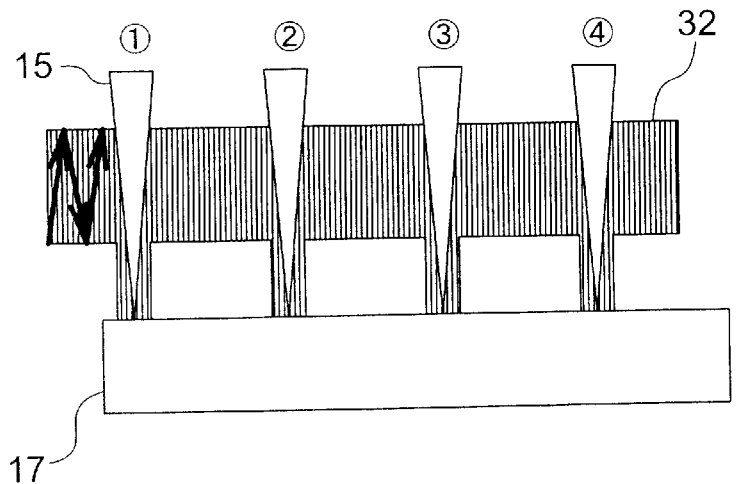
FIG. 3 is a view illustrating the measurement operation of the probe tip of the second embodiment of the present invention.

Next, the second embodiment of the present invention will be explained with reference to FIG. 3. The configuration of this embodiment as the atomic force microscope is the same as the configuration shown in FIG. 1. A different point is to use a signal for descent movement in trigger pulse periodically at the spots corresponding to the measuring points (sampling points) as the cyclic signal of low frequency between the two cyclic signals outputted from the two frequency signals generating section 27. The cyclic signal of the other high frequency is the same as that of the first embodiment. In the figure, a reference numeral 32 designates the pattern of the composite movement formed by the two frequency signals. In this embodiment, the contact time of the probe tip 15 on the sample surface can be shortened to perform very high-speed measurement and the wear thereof can be prevented as well as the first embodiment.

Although the movement formed by composing the two frequency signals is used as that of the probe tip 15 to the surface of the sample 17, the number of the frequency signals is not limited to two but may be more than two. Moreover, although the above-mentioned cases are explained about the atomic force microscope, the present invention is naturally applicable to the scanning probe microscope of the other types, such as a scanning tunneling microscope.

The present disclosure relates to subject matter contained in Japanese Patent Application No. 2001-1222, filed on Jan. 9, 2001, the disclosure of which is expressly incorporated herein by reference in its entirety.

What is claimed is:

1. A scanning probe microscope having a cantilever with a probe tip facing a sample, a fine movement section for changing a distance between said sample and said probe tip, a scanning control section for providing relative displacement toward a sample surface between said sample and said probe tip, a displacement detecting means for detecting a displacement of said cantilever, and a control means for controlling displacement of said cantilever, wherein, when a deformation is generated in said cantilever due to a physical interaction between said probe tip and said sample, said displacement detecting means detects the displacement of said cantilever due to the deformation thereof, and said control means performs control to maintain the displacement of said cantilever at a predetermined constant value to measure the physical interaction on the surface of said sample, the scanning probe microscope section further comprising, a two frequency signal generating section for providing signals, used to cause said probe tip to be moved in a height direction by at least two frequencies, to said fine movement section, wherein said probe tip is moved in the height direction using the at least two frequencies by means of said two frequency signal generating section, and said physical interaction generated between said probe tip and said sample surface is detected when said probe tip approaches said sample based on the second frequency, and wherein, concerning movement based on said two frequencies, the movement due to the first frequency is a sine wave movement and the movement due to the second frequency is a trigger pulse movement.

* * * * *